United States Patent
Kumar

(12) United States Patent (10) Patent No.: US 8,117,188 B1
Kumar (45) Date of Patent: Feb. 14, 2012

(54) EVALUATION OF MULTIPLE XPATH QUERIES IN A STREAMING XPATH PROCESSOR

(75) Inventor: Arun Kumar, Bangalore (IN)

(73) Assignee: Sonoa Networks India (PVT) Ltd., Bangalore (IN)

( * ) Notice: Subject to any disclaimer, the term of this patent is extended or adjusted under 35 U.S.C. 154(b) by 474 days.

(21) Appl. No.: 12/056,292

(22) Filed: Mar. 27, 2008

(51) Int. Cl.
*G06F 7/00* (2006.01)

(52) U.S. Cl. .................................. 707/716

(58) Field of Classification Search .......... 707/716
See application file for complete search history.

(56) References Cited

U.S. PATENT DOCUMENTS

| 2004/0205082 | A1 | 10/2004 | Fontoura |
| 2004/0261019 | A1 | 12/2004 | Imamura |
| 2005/0203957 | A1* | 9/2005 | Wang et al. ............ 707/104.1 |

OTHER PUBLICATIONS

Author: Yanlei Diao, Michael J. Franklin Title: "High-Performance XML Filtering: An Overview of YFilter" 2003.

Author: Yanlei Diao, Michael J. Franklin, Hao Zhang, Peter M. Fischer, Mehmet Altinel Title: "Path Sharing and Predicate Evaluation for High-Performance XML Filtering" Dec. 2003 ACM Transactions on Database Systems (TODS), vol. 28 Issue 4 Publisher: ACM.

* cited by examiner

*Primary Examiner* — Apu Mofiz
*Assistant Examiner* — Ajith Jacob
(74) *Attorney, Agent, or Firm* — Evergreen Valley Law Group, P.C.; Kanika Radhakrishnan

(57) ABSTRACT

Evaluation of Multiple XPath Queries in a Streaming XPath Processor. A hit of a location path is determined in a SAX event. All XPath queries corresponding to the location path are then identified. XML nodes associated with the SAX event is identified as potential output nodes for all XPath queries including the location path as a main location path. The potential output nodes are nodes satisfying criteria of a node test of a last location step of the main location path. The potential output nodes are then buffered for all XPath queries comprising unevaluated predicates. For each XPath query the potential output nodes are buffered at a location step including an unevaluated predicate. Thereafter, all XPath queries are evaluated by progressively evaluating the unevaluated predicates of all XPath queries based on availability of data.

17 Claims, 6 Drawing Sheets

| Type | Name | Attribute |
|---|---|---|
| begin | root | |
| begin | pub | |
| begin | book | ~414 |
| begin | price | ~415 |
| text | price | (text,25) ~416 |
| end | price | |
| end | book | ~418 |
| begin | book | ~420 |
| begin | price | |
| text | price | (text,70) ~422 |
| end | price | |
| end | book | ~423 |
| begin | year | |
| text | year | (text,2006) ~424 |
| end | year | ~425 |
| begin | book | ~426 |
| begin | price | |
| text | price | (text,85) ~428 |
| end | price | |
| end | book | ~430 |
| end | root | |

EVALUATION OF MULTIPLE XPATH QUERIES IN A STREAMING XPATH PROCESSOR

BACKGROUND

Technical Field

Embodiments of the invention relate generally to the field of Extensive Markup Language (XML) and more particularly to evaluating XPath queries.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

PRIOR ART

Hypertext Markup Language (HTML) is a markup language designed for the creation of web pages with hypertext and other information to be displayed in a web browser. XML is a language describing structure of data and is not a fixed set of elements like HTML. Over a period of time, the use of XML as a data exchange format has increased tremendously.

XPath is an expression language used for addressing XML documents. XPath also provides basic facilities for manipulation of strings, numbers and Booleans. XPath operates on logical structure of XML documents. At any given point of time an XPath processor receives several streams of the XML documents. The XPath processor also receives several user profiles or preferences in the form of XPath queries. An XPath query includes one or more location steps, for example, /root/pub [year>2006]/book includes three location steps "/root", "/pub[year>2006]" and "/book". A location step, for example, /pub[year>2006] includes an axis, for example, "/", a node test, for example, "pub" and zero or more predicates, for example, "[year>2006]". A node test identifies nodes in the XML document that meet the criteria of the test. The XPath processor evaluates the XPath queries on the online streams of XML documents and selects the appropriate results for the XPath queries. As the number of XPath queries and the online streams of the XML documents are huge, an efficient technique for evaluating XPath queries is needed.

Currently one technique for evaluating XPath queries on a XML document makes use of out of line approach. An XPath query including one or more location steps is received. The one or more location steps include several predicates. A set of possible output nodes on which predicates have to be applied are accumulated. All the predicates are applied after parsing of the XML document is complete and then an output is sent. However, the accumulation of the set of all the possible output nodes till parsing is complete results in an inefficient usage of memory, which in turn could impact the overall performance of the application. Another shortcoming of an out of line approach lies in the fact that output is delayed till parsing is complete.

U.S. patent application publication (20070250471A1), discloses a method for running XPath queries over XML streams with incremental predicate evaluation.

In light of the foregoing discussion, there is a need for an efficient method and system for XPath queries evaluation.

SUMMARY

Embodiments of the invention described herein provide a method and system for evaluating XPath queries in a streaming XPath processor.

An example method includes determining hit of a location path in a SAX event. All XPath queries corresponding to the location path are then identified. Further, XML nodes associated with the SAX event is identified as potential output nodes for all XPath queries including the location path as a main location path. The potential output nodes are node satisfying criteria of a node test of a last location step of the main location path. The potential output nodes for all XPath queries including unevaluated predicates are then buffered. The potential output nodes for each XPath query is buffered at a location step including an unevaluated predicate. Thereafter, all XPath queries are evaluated by progressively evaluating the unevaluated predicates of all XPath queries based on availability of data.

An example system includes a location module for determining hit of a location path. The system also includes an XPath query identification module for identifying all XPath queries corresponding to the location path. The system further includes a node identification module for identifying XML nodes corresponding to the location path as potential output nodes. The system also includes a buffer module for buffering potential output nodes for all XPath queries and intermediate or complete predicate evaluation results. Further, the system includes a predicate evaluation engine for progressively evaluating unevaluated predicates of all XPath queries based on availability of data.

An example machine-readable medium product includes instructions operable to cause a programmable processor to perform determining hit of a location path in a SAX event. All XPath queries corresponding to the location path are then identified. Further, XML nodes associated with the SAX event is identified as potential output nodes for all XPath queries including the location path as a main location path. The potential output nodes are nodes satisfying criteria of a node test of a last location step of the main location path. The potential output nodes for all XPath queries including unevaluated predicates are then buffered. The potential output nodes for each XPath query is buffered at a location step comprising an unevaluated predicate. Thereafter, all XPath queries are evaluated by progressively evaluating the unevaluated predicates of all XPath queries based on availability of data.

BRIEF DESCRIPTION OF THE DRAWINGS

FIG. 4a and FIG. 4b are schematic representations of an exemplary XPath query, an exemplary XML document and an exemplary sequence of SAX events for the exemplary XML document in accordance with an embodiment of the invention.

DETAILED DESCRIPTION OF THE EMBODIMENTS

Figure 1:
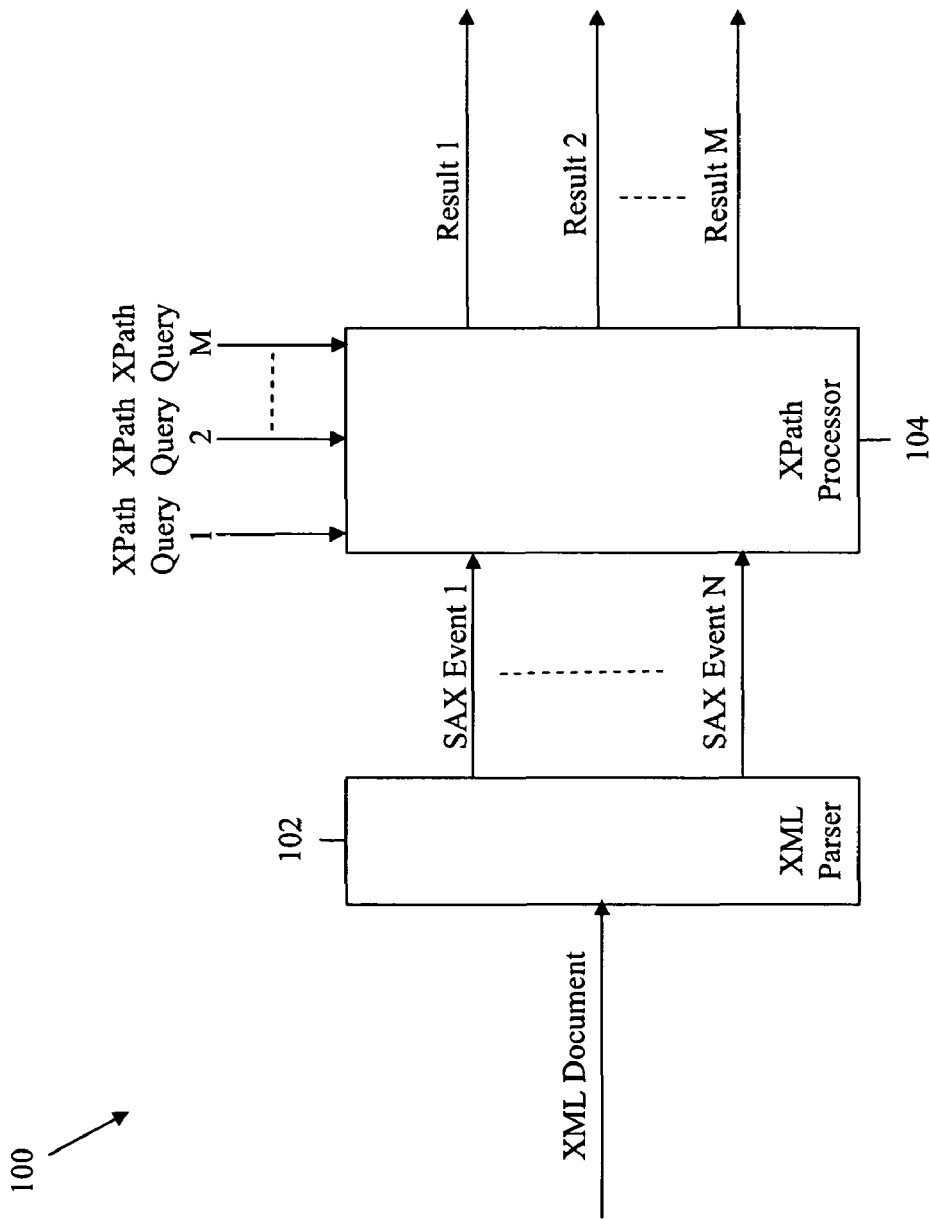
FIG. 1 is a block diagram of an environment in which various embodiments of the invention may be practiced.

FIG. 1 is a block diagram of an environment 100 in which various embodiments of the invention may be practiced. Environment 100 includes an XML parser 102 and an XPath processor 104. XML parser 102 receives several online streams of XML documents. XML parser 102 may include an application program interface (API), for example, Simple API XML (SAX), for parsing XML documents. XML parser 102 parses an XML document to create SAX events, for example, SAX event 1. A SAX event may include XML text nodes, XML element nodes, XML processing instructions, XML comments, and a sequence of SAX events. XPath processor 104 subscribes to SAX events from XML parser 102.

XPath processor 104 receives the SAX events. XPath processor 104 also receives several XPath queries. XPath queries are user profiles or preferences in an XPath format. Example of XPath queries may include but are not limited to complete XPath queries, parts of XPath queries, group of XPath queries, XPath expressions, XPath predicate expressions and XPath predicates.

An XPath query includes one or more location steps, for example, /root/pub[year>2006]/book includes three location steps "/root", "/pub[year>2006]" and "/book". A location step, for example, /pub[year>2006] includes an axis, for example, "/", a node test, for example, "pub" and zero or more predicates, for example, "[year>2006]". A node test identifies nodes in a SAX event that meet the criteria of the test. For example, node test "book" may include a criterion element name. The results that match the criterion include nodes corresponding to the books in the SAX event. The XPath query also includes one main location path and one or more nested location paths. Location path describes the address of one node with respect to another by using path identifications (path ids). For example, /root/pub/book is the main location path and /root/pub/year is a nested location path.

XPath processor 104 reads the SAX events one by one and processes several XPath queries simultaneously on the SAX event. In an embodiment of the invention, XPath processor 104 uses inline approach for evaluation of the XPath queries.

Embodiments of the invention are implemented using Y-filter algorithm. The XPath queries are compiled yielding in Nondeterministic Finite Automata, which is hash table tree according to Y-filter algorithm. The Nondeterministic Finite Automata is used during the runtime of XPath processor 104 for evaluating XPath queries in response to SAX events.

XPath processor 104 may include several modules for evaluating the XPath queries. XPath processor 104 including several modules is explained in detail in conjunction with FIG. 2.

Figure 2:
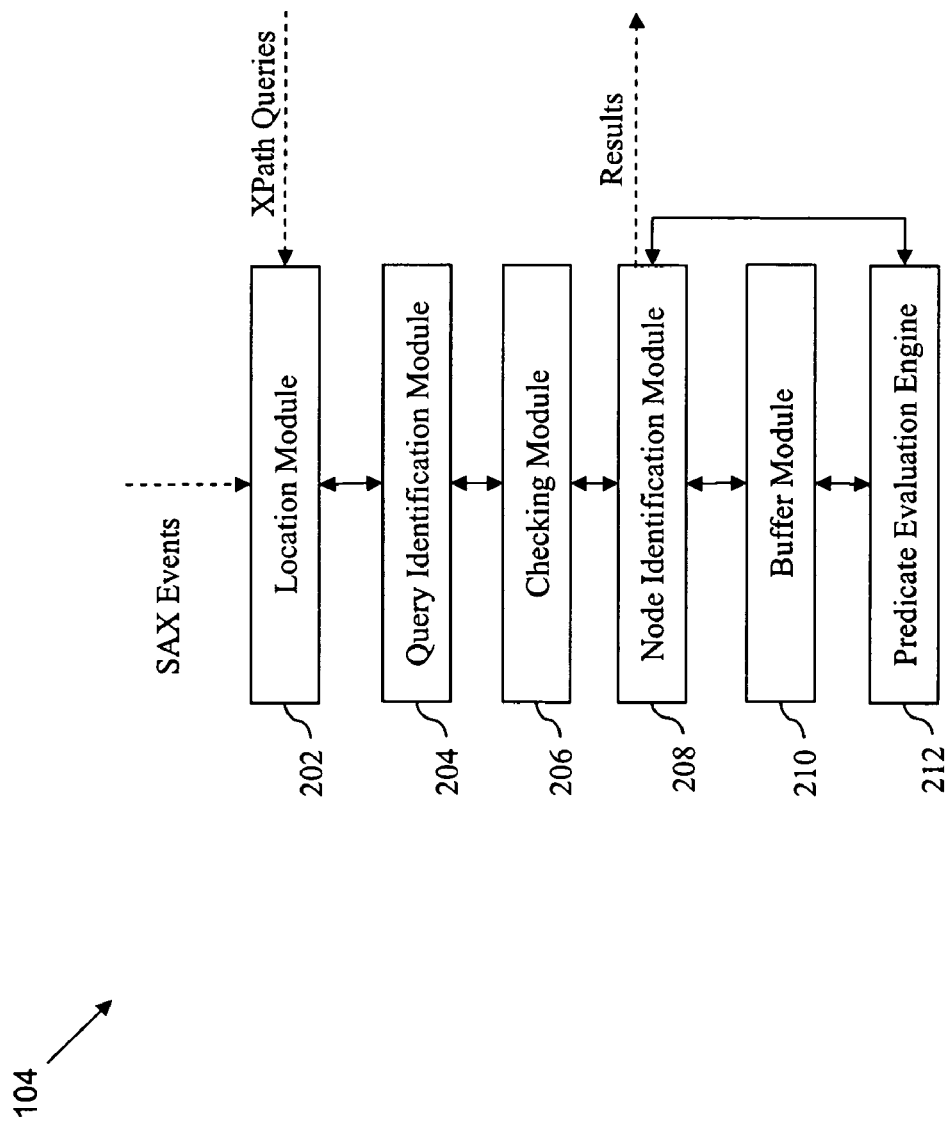
FIG. 2 is a schematic representation of an XPath processor in accordance with an embodiment of the invention.

FIG. 2 is a schematic representation of an XPath processor in accordance with an embodiment of the invention.

XPath processor 104 includes a location module 202, a query identification module 204, a checking module 206, a node identification module 208, a buffer module 210 and a predicate evaluation engine 212.

Location module 202 receives an online stream of XML message in form of SAX events and reads the SAX events one by one. Location module 202 determines hit of a location path in a SAX event. A query identification module 204 then identifies all XPath queries corresponding to the location path. After identifying all XPath queries corresponding to the location path, checking module 206 checks if the location path is a main location path. If the location path is a main location path, XML nodes corresponding to the location path are identified as potential output nodes using potential identification module 208. In an embodiment of the invention, the potential output nodes are nodes satisfying criteria of a node test of a last location step of the main location path. Buffer module 210 is then used to buffer the potential output nodes and intermediate or complete predicate evaluation results. In an embodiment of the invention, buffers are maintained at a location step including the unevaluated predicates. If the location path is not the main location path, a predicate expression to which the location path belongs is evaluated using predicate evaluation engine 212.

In an embodiment of the invention, query identification module 204 works based on Y-filter algorithm including Nondeterministic Finite Automation (NFA) algorithm.

In an embodiment of the invention, checking module 206 and predicate evaluation engine 212 may also work based on one or more algorithms.

Figure 3:
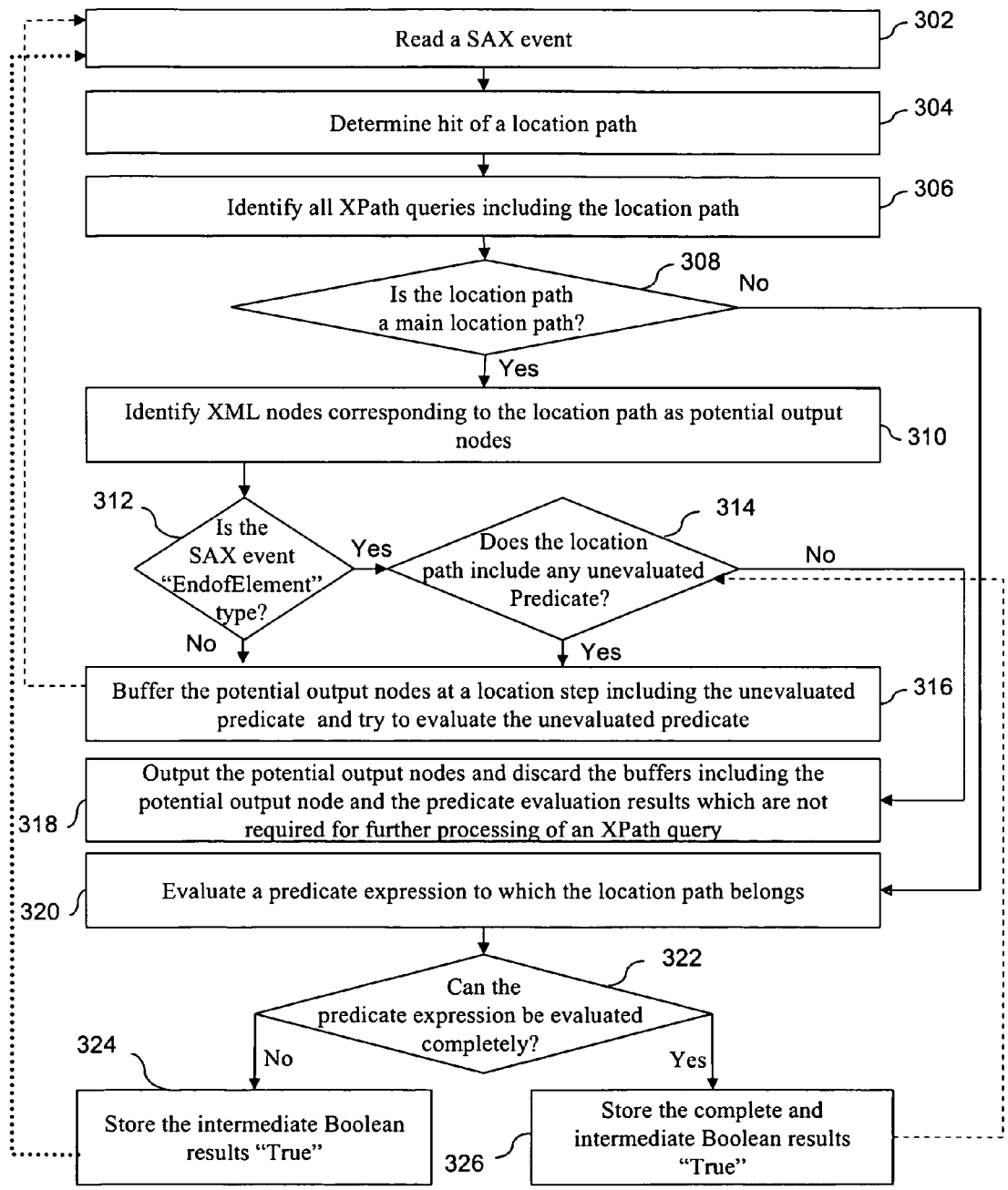
FIG. 3 is a flowchart illustrating a method for evaluating XPath queries in accordance with an embodiment of the invention.

FIG. 3 is a flowchart illustrating a method for evaluating one or more XPath queries in accordance with an embodiment of the invention. Several XPath queries including various user profiles or preferences are received. An XPath query includes one or more location steps. Each location step may include an axis, a node test and zero or more predicates, for example, XPath predicates. The XPath query also includes one main location path and one or more nested paths.

At step 302, a sequence of SAX events is received and read one by one. The SAX event is created by parsing an XML document received on an online stream. One or more XPath queries are then processed simultaneously on the sequence of SAX events. In an embodiment of the invention, the SAX event is read only once for processing multiple XPath queries.

At step 304, a hit of a location path is determined. The hit is determined by encountering an XML element or an XML attribute in the SAX event which is required for processing of various XPath queries. Location paths describe the address of one node with respect to another. The hit indicates that the location path is in an accepting state reached by Y-filter Nondeterministic Finite Automation (NFA) algorithm. In an embodiment of the invention, the hit is determined only once for the location path in a particular SAX event.

Once the location path is hit, at step 306 all XPath queries including the location path are identified. In an embodiment of the invention, the location path has different path identifications (ids) for different XPath queries. These path ids are used as key to obtain the parsed data structures of the XPath queries during compilation time. Multiple XPath queries are then processed.

In an embodiment of the invention, steps 308 to 326 are performed for all XPath queries including the location path which is hit.

At step 308, a check is performed to find if the location path includes a main location path. If the location path includes the main location path then step 310 is performed else, step 320 is performed. For example, location path "/root/pub/book/price" includes main location path "/root/pub/book" of query "/root/pub[year>2006]/book[price>60]".

If the location path does not include the main location path, at step 320, a predicate expression to which the location path belongs is evaluated.

If the location path includes the main location path then at step 310, XML nodes corresponding to the location path are identified as potential output nodes. In an embodiment of the invention, potential output nodes are nodes of the XML document satisfying criteria of a node test of a last location step of the main location path of an XPath query. For example, XPath query "/root/pub[year>2006]/book" includes main location path "/root/pub/book" and has the node test "book" of the last location step "/book". The criterion of node test "book" includes an element name. The results that satisfy the criterion include nodes corresponding to the element books in the XML document. The nodes corresponding to the books in the XML document are identified as potential output nodes for the XPath queries having node test "book" at the last location step of the main location path.

Further, at step 312, a check is performed to find out if the SAX event is an "Endof Element" type event. For example, </book> is an EndofElement type event. If the SAX event is an EndofElement type then step 314 is performed else, step 316 is performed.

If the SAX event is an "EndofElement" type event then at step 314, a check is performed to find if the location path includes any unevaluated predicate. In an embodiment of the invention, all location steps of the location path are checked to find out if any location step includes an unevaluated predicate. In an embodiment of the invention, using a path id of the main location path of an XPath query, information of the entire XPath query is obtained, for example, which location step has an unevaluated predicate. In another embodiment of the invention, the storage of the predicate is checked to determine if the predicate is unevaluated. If the stored result is not "True" then the predicate is unevaluated. In an embodiment of the invention, the check is performed sequentially. The any location step may include the current location step or location steps preceding the current location step. If there is an unevaluated predicate in any location step then step 316 is performed else, at step 318, the potential output nodes are outputted and the buffers including the potential output nodes and predicate evaluation results which are not required for further processing of XPath query are discarded.

If the SAX event is not EndofElement type event or if there is an unevaluated predicate in any location step then at step 316, the potential output nodes are buffered at the location step and if the location step includes any unevaluated predicate then an attempt is made to evaluate the unevaluated predicate. For example, when SAX event "price=70" is encountered then for XPath query "/root/pub[year>2006]/book[price>60]" the nodes corresponding to "price=70" are buffered at the location step "/book[price>60]" and the predicate [price>60] is evaluated. In an embodiment of the invention, the location step may be the current location step or any other location step. After buffering the potential output nodes, next SAX event is read at step 302.

If the location path is not a main location path at step 308 then step 320 is performed. At step 320, the predicate expression to which the location path belongs is evaluated. The predicate expression is evaluated using one or more evaluation techniques. Examples of the one or more evaluation techniques include but are not limited to bottom-up evaluation technique, progressive evaluation technique, incremental evaluation technique, top-down evaluation technique and hybrid evaluation technique.

At step 322, a check is performed to find out if the predicate expression can be evaluated completely. If the predicate expression can be evaluated completely step 326 is performed else, step 324 is performed.

If the predicate expression cannot be evaluated completely then at step 324, the intermediate Boolean results "True" are stored in the buffer and next SAX event is read at step 302.

If the predicate expression can be evaluated completely then at step 326, the complete or intermediate Boolean results "True" are stored in a buffer and step 314 is performed.

In an embodiment of the invention, the buffer includes potential output nodes and intermediate or complete results of predicate evaluations. Further, the size of buffer may be determined based on the run-time size of the memory. The storage for storing predicate result may be allotted during parsing of an XPath query. In an embodiment of the invention, a hash map including path ids of the XPath queries is maintained. At any time during processing of the XPath queries, the path ids are used as a key for accessing buffers of different XPath queries stored in the single NFA run-time stack in the memory.

In an embodiment of the invention, the potential output nodes in the buffer are discarded as soon as they are outputted. Further, stored results of predicates in the buffer are also discarded if at the end of SAX event it is determined that the predicate results are not required for processing the XPath queries. In an embodiment of the invention, buffers including potential output nodes and complete or intermediate predicate evaluation results are moved to a location step, if the location step includes any unevaluated predicate.

In an embodiment of the invention, one or more steps of step 302 to step 326 may be implemented using a state machine. For example, if there are two XPath queries /A/B[x>5]/C and /A/B[x>5]/D then the first state of the state machine will be A. Now, it will expect B. Next state will expect either x or C or D. In case x is now encountered in the SAX event then predicate "[x>5]" is evaluated and a Boolean result "True" is stored if the predicate evaluates to true. In case C is encountered in the SAX event then nodes corresponding to C are buffered. In case first C and then D is encountered in the SAX events then nodes corresponding to C and D are buffered separately in a single NFA run-time stack. Hence, several XPath queries are processed simultaneously on one XML document.

In embodiment of the invention, the pseudo code used to perform Output Buffering and Predicate Evaluation of XPath Queries is as follows:

Algorithm: Output Buffering and Predicate Evaluation of XPath Queries

Whenever an accepting state is reached by Y-Filter NFA algorithm this function is called.

Input: NFA node that caused the current hit.
Accepting State from NFA node
XML node structure corresponding to current EndOfElement SAX event.

Output: If the LocationPathId in the Accepting State is the MainLocationPath then the XMLNode is a candidate output node for that query. If the LocationPath does not contain any predicates or if all predicates have been evaluated to TRUE then the XMLNode is sent to output along with the query id. If there is any unevaluated predicate then the XMLNode gets buffered at the LocationStep containing the unevaluated predicate. If the LocationPath is not a MainLocationPath and belongs to predicate expression, then that part of the predicate expression to which the LocationPath belongs is evaluated. The intermediate results of the predicate evaluation are stored at the LocationStep level containing the predicate expression. If the whole predicate expression gets evaluated then the complete expression's result is stored at the LocationStep level containing the predicate expression.

--- for each LocationPathId in Accepting State List
   Obtain LocationPath datastructure using LocationPathId
   If LocationPath is MainLocationPath
     Set Cur LocationStep to Last LocationStep of LocationPath

```
        while TRUE
            /*
                A location step containing a predicate expression is called
                Buffering Step
            */
            If LocationStep has no Buffering Step
                Obtain QueryId from LocationPath datastructure
                Send CurXmlNode along with QueryId to output
                break;
            Get BufferingStepNum from CurLocationStep
            Set BufferDistance to (CurLocationStepNum - BufferingStepNum)
            Set BufferingNfaNode to InputNfaNode
            for i = 0 to BufferDistance
                BufferingNfaNode = BufferingNfaNode->ParentNfaNode
            /*
                BufferInfo structure can collect buffered results. It also
                holds the pointer to PredicateResult structure. PredicateResult
                has storage for storing intermediate boolean results of a
                predicate expression and also has a place to store the
                whole predicate expression's result
            */
            Set BufferInfo to NULL
            If BufferingNfaNode->BufferMap is NULL
                BufferingNfaNode->BufferMap = new HashMap
            Else
                BufferInfo = Lookup BufferingNfaNode->
                BufferMap( LocationPathId )
            If BufferInfo is NULL
                Create new BufferInfo
                Add BufferInfo to BufferingNfaNode->
BufferMap( LocationPathId, BufferInfo )
            while (BufferedInfo->PredicateResult is TRUE)
                Get BufferingStepNum from CurLocationStep
                Get BufferingStepNum from CurLocationStep
                Set BufferDistance to (CurLocationStepNum -
                BufferingStepNum)
                Set BufferingNfaNode to InputNfaNode
                for i = 0 to BufferDistance
                    BufferingNfaNode = BufferingNfaNode->ParentNfaNode
                If BufferInfo->PredicateResult is UNKNOWN
                    Add CurXmlNode result to BufferInfo->BufferedResultList
                    break;
                /*
                    If predicate result is FALSE the current result is discarded
and not buffered.
                */
                If BufferInfo->PredicateResult is FALSE
                    break;
                Set CurLocationStep to BufferingStep.
            end while
            continue;
        end if
        /*
            Current LocationPath is not MainLocationPath. Hence it is part
of a predicate expression.
        */
        Get the predicate expression tree of LocationPath
        Identify the subexpression of which LocationPath is part of starting
        from the LocationPath node which is always a leaf node of the
        expression tree.
        If subexpression is already evaluated
            continue
        Evaluate subexpression.
        If Result is FALSE
            Continue
        /*
            Current LocationPath is part of a predicate expression and is
            always a RelativeLocationPath. AbsoluteLocationPath in predicate
            is not supported.
        */
        Set BufferDistance to StepCount in LocationPath
        Set BufferingNfaNode to InputNfaNode
        for i = 0 to BufferDistance
            BufferingNfaNode = BufferingNfaNode->ParentNfaNode
        /*
            BufferInfo structure can collect buffered results. It also
            holds the pointer to PredicateResult structure. PredicateResult
            has storage for storing intermediate boolean results of a
            predicate expression and also has a place to store the
            whole predicate expression's result
```
```
        */
        Set BufferInfo to NULL
        If BufferingNfaNode->BufferMap is NULL
            BufferingNfaNode->BufferMap = new HashMap
        Else
            BufferInfo = Lookup BufferingNfaNode->
            BufferMap( LocationPath->ParentPathId )
        If BufferInfo is NULL
            Create new BufferInfo
            Add BufferInfo to BufferingNfaNode->BufferMap( LocationPathId,
            BufferInfo )
        Store the intermediate result TRUE of subexpression in
        PredicateResultStorage of BufferInfo
        If whole predicate expression can be evaluated then store the
        PredicateResult in BufferInfo
            If whole predicate result is TRUE
                If BufferInfo->BufferedResultList is not empty
                    Set CurResultList to BufferInfo->BufferedResultList
                    Set CurLocationStep to BufferingStep
                    while TRUE
                        /*
                            A location step containing a predicate expression is called
                            Buffering Step
                        */
                        If LocationStep has no Buffering Step
                            Obtain QueryId from LocationPath datastructure
                            Send CurResultList along with QueryId to output
                            break;
                        Get BufferingStepNum from CurLocationStep
                        Set BufferDistance to (CurLocationStepNum -
                        BufferingStepNum)
                        Set BufferingNfaNode to InputNfaNode
                        for i = 0 to BufferDistance
                            BufferingNfaNode = BufferingNfaNode->ParentNfaNode
                        /*
                            BufferInfo structure can collect buffered results. It also
                            holds the pointer to PredicateResult structure.
                            PredicateResult has storage for storing intermediate
                            boolean results of a predicate expression and also has a
                            place to store the whole predicate expression's result
                        */
                        Set BufferInfo to NULL
                        If BufferingNfaNode->BufferMap is NULL
                            BufferingNfaNode->BufferMap = new HashMap
                        Else
                            BufferInfo = Lookup BufferingNfaNode->
                            BufferMap( LocationPathId )
                        If BufferInfo is NULL
                            Create new BufferInfo
                            Add BufferInfo to BufferingNfaNode->
BufferMap( LocationPathId, BufferInfo )
                        while (BufferedInfo->PredicateResult is TRUE)
                            Get BufferingStepNum from CurLocationStep
                            Get BufferingStepNum from CurLocationStep
                            Set BufferDistance to (CurLocationStepNum -
                            BufferingStepNum)
                            Set BufferingNfaNode to InputNfaNode
                            for i = 0 to BufferDistance
                                BufferingNfaNode = BufferingNfaNode->ParentNfaNode
                            If BufferInfo->PredicateResult is UNKNOWN
                                Add CurResultList result to BufferInfo->BufferedResultList
                                break;
                            /*
                                If predicate result is FALSE the current result list is
                                discarded.
                            */
                            If BufferInfo->PredicateResult is FALSE
                                Empty CurResultList
                                break;
                            Set CurLocationStep to BufferingStep.
                        end while
                    end if
                end if
            end if
        end foreach
Algorithm: Cleanup of buffers during EndOfElement SAX event
// Pop and free the top element from runtime NfaStack
Pop RuntimeNfaStack
Get current top NfaStackElement from the Stack.
// Cleanup buffers of NfaNodes in the top NfaStackElement
```

-continued

```
foreach NfaNode in NfaStackElement->NfaNodeList
    if NfaNode->BufferMap IS NOT NULL
        foreach BufferInfo in BufferMap
            Cleanup BufferInfo
            free BufferInfo
        free NfaNode->BufferMap
        set NfaNode->BufferMap to NULL
```

Figure 4A:
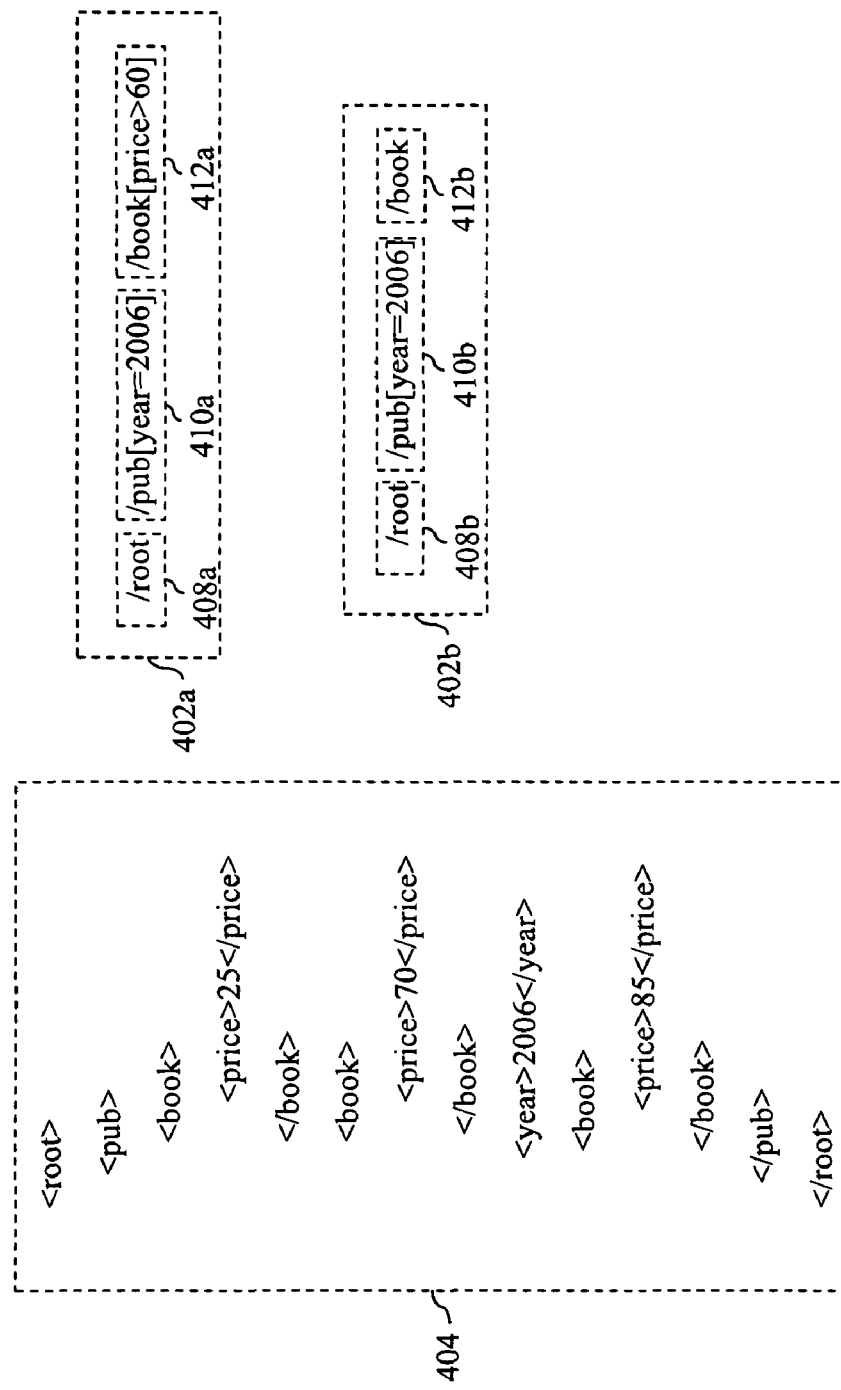

The method described above is explained in detail, with the help of an example, in conjunction with FIG. 4a and FIG. 4b.

FIG. 4a and FIG. 4b are schematic representations of an exemplary XPath query 402a, an exemplary XPath query 402b, an exemplary XML document 404, and an exemplary sequence of SAX events 406 for XML document 404. XPath query 402a includes one or more location steps including location step 408a, location step 410a and location step 412a. XPath query 402b includes one or more location steps including location step 408b, location step 410b and location step 412b.

Each location step of XPath query 402a and XPath query 402b may include an axis, a node test and zero or more predicates. For example, location steps 410a and 410b include axis "/", node test "pub" and a predicate "[year= 2006]".

XML document 404 is received in form of sequence of SAX events 406 and XPath query 402a and XPath query 402b are processed simultaneously on sequence of SAX events 406 by reading one SAX event at a time. In an embodiment of the invention, SAX events are read sequentially.

Only the major SAX events are discussed below in the example. It will be appreciated that there are several SAX events in between that are encountered and several XPath queries are processed using those SAX events. For example, there is a SAX event 415 between SAX event 414 and SAX event 416.

SAX event 414 satisfying criteria for node test "book" is encountered. The encountering of the node test book indicates hit of a location path. Once the location path is hit, all the XPath queries including the location path are identified using the respective path ids. In an embodiment of the invention, XPath query 402a and XPath query 402b corresponding to the location path are identified using the path ids. Both XPath query 402a and XPath query 402b are then processed.

For XPath query 402a the following steps are performed:

A check is performed to find if the location path includes a main location path "/root/pub/book" of XPath query 402a. In an embodiment of the invention, the location path includes the main location path. The node test "book" is the node test of the last location step of the main location path of XPath query 402a. The node corresponding to SAX event 414 is identified as potential output node. Further, a check is performed to find if SAX event 414 is EndofElement type. Since, SAX event 414 is not EndofElement type, the potential output node is stored in a buffer corresponding to XPath query 402a at location step 412a and next SAX event is awaited.

Similarly for XPath query 402b the following steps are performed:

A check is performed to find if the location path includes the main location path "/root/pub/book" of XPath query 402b. In an embodiment of the invention, the location path includes the main location path. The node test "book" is the node test of the last location step of the main location path of XPath query 402b. The node corresponding to SAX event 414 is identified as potential output node. Further, since SAX event 414 is not EndofElement type, the potential output node is stored in a buffer corresponding to XPath query 402b at location step 412b and next SAX event is awaited.

In an embodiment of the invention, buffers corresponding to XPath query 402a and XPath query 402b are maintained separately in a single NFA run-time stack.

Further, SAX event 416 is encountered.

For XPath query 402a the following steps are then performed:

A check is performed to find if the location path includes the main location path "/root/pub/book" of XPath query 402a. In an embodiment of the invention, the location path includes the main location path. The node corresponding to SAX event 416 is identified as potential output node and buffered at location step 412a. Further, as location step 412a includes an unevaluated predicate ["price>60"] the predicate is evaluated using progressive predicate evaluation technique. The evaluation results in False since SAX event 416 does not include content satisfying the predicate ["price>60"] and next SAX event is then awaited.

Similarly, for XPath query 402b the following steps are performed:

A check is performed to find if the location path includes the main location path "/root/pub/book" of XPath query 402b. In an embodiment of the invention, the location path includes the main location path. The node corresponding to SAX event 416 is identified as potential output node and buffered at location step 412b. Next SAX event is then awaited.

SAX event 417 which is an EndofElement type is encountered.

For XPath query 402b the following steps are performed:

In an embodiment of the invention, the location path corresponding to SAX event 417 includes the main location path. Since, SAX event 417 is EndofElement type and the progressive predicate evaluation results in false the potential output nodes for SAX event 415 and SAX event 416 stored in the buffer at location step 412a are discarded and next SAX event is awaited.

For XPath query 402b the following steps are performed:

In an embodiment of the invention, the location path includes the main location path. Since, SAX event 417 is EndofElement type for a predicate expression the nodes corresponding to SAX event 417 is buffered at location step 412b and next SAX event is awaited.

SAX event 418 which is an EndofElement type is encountered.

For XPath query 402a the following steps are performed:

In an embodiment of the invention, the location path corresponding to SAX event 418 includes the main location path. Since, SAX event 418 is EndofElement type and the progressive predicate evaluation results in false the potential output nodes stored in the buffer at location step 412a corresponding to SAX event 414 are discarded and next SAX event is awaited.

For XPath query 402b the following steps are performed:

In an embodiment of the invention, the location path includes the main location path. A check is performed to find if any location step includes an unevaluated predicate. Location step 410b includes an unevaluated predicate ["year>2006"]. An attempt is made to evaluate the predicate using progressive predicate evaluation technique. Since content satisfying predicate ["year=2006"] is not encountered, the buffer of the potential output nodes maintained at location step 412b is moved to location step 410b and next SAX event is awaited.

SAX event 420 is encountered.

For XPath query 402a the following steps are performed:

In an embodiment of the invention, the location path includes the main location path. The node test "book" is the node test of the last location step of the main location path of XPath query 402a. The nodes satisfying criteria for node test "book" are then identified as potential output nodes. Further, a check is performed to find if SAX event is EndofElement type. Since, SAX event 420 is not EndofElement type, the potential output nodes are stored in a buffer corresponding to XPath query 402a at location step 412a and the next SAX event is awaited.

Similarly for XPath query 402b the potential output nodes are stored in a buffer at location step 412b and the next SAX event is awaited.

SAX event 422 is encountered.

For XPath query 402a the following steps are performed:

In an embodiment of the invention, the location path includes the main location path. The node corresponding to SAX event 422 is identified as potential output node and buffered at location step 412a. Further, as location step 412a includes an unevaluated predicate ["price>60"] the predicate is evaluated using progressive predicate evaluation technique. The predicate evaluation results in True since SAX event 422 includes content satisfying the predicate ["price>60"]. The result of predicate evaluation is stored in the buffer at location step 412a and next SAX event is awaited.

For XPath query 402b the node corresponding to SAX event 422 is identified as potential output node and buffered at location step 412b. Next SAX event is then awaited.

SAX event 423 which is an EndofElement type is encountered.

For XPath query 402a the following steps are performed:

In an embodiment of the invention, the location path includes the main location path. A check is performed to find if any location step includes an unevaluated predicate. Since, location step 410a includes an unevaluated predicate, the buffer including the potential output nodes and predicate evaluation results is now moved to location step 410a. An attempt is then made to evaluate the predicate ["year>2006"]. Since content satisfying the predicate ["year>2006"] is not encountered, the next SAX event is awaited.

Similarly, for XPath query 402b the buffer including the potential output nodes and predicate evaluation results is now moved to location step 410b. An attempt is then made to evaluate the predicate ["year>2006"]. Since content satisfying the predicate ["year>2006"] is not encountered, the next SAX event is awaited.

SAX event 424 is encountered.

For XPath query 402a the following steps are performed:

A check is performed to find if the location path is a main location path. Since SAX event 424 is not a part of the main location path, the predicate to which the location path belongs is evaluated. Location step 410a includes an unevaluated predicate ["year>2006"]. The predicate expression is evaluated using progressive predicate evaluation technique. The predicate evaluation results in true since SAX event 424 includes content satisfying the predicate ["year>2006"]. The result "True" of complete predicate evaluation is stored in the buffer at location step 410a and next SAX event is awaited.

Similarly, for XPath query 402b the result "True" of complete predicate evaluation is stored in the buffer at location step 410b and next SAX event is awaited.

SAX event 425 which is EndofElement type is encountered.

For XPath query 402a the following steps are performed:

A check is performed to find if any location step includes an unevaluated predicate. Since XPath query 402a does not include any unevaluated predicate, the potential output nodes are outputted and the storage including the potential output node is cleared. The storage of result of evaluation of predicate "[price>60]" is cleared as it is not required for further processing of XPath query 402a. However, the storage of result of evaluation of predicate "[year=2006]" is maintained for further processing as EndofElement type SAX event for "pub" is not encountered yet.

Similarly, for XPath query 402b the potential output nodes are outputted and the storage including the potential output node is cleared. However, the storage of result of evaluation of predicate "[year=2006]" is maintained for further processing as EndofElement type SAX event for "pub" is not encountered yet.

SAX event 426 is encountered.

For XPath query 402a the following steps are performed:

In an embodiment of the invention, the location path includes the main location path. The node test "book" is the node test of the last location step of the main location path of XPath query 402a. The nodes satisfying criteria for node test "book" are then identified as potential output nodes. Further, a check is performed to find if SAX event is EndofElement type. Since SAX event 426 is not EndofElement type, the potential output nodes are stored in a buffer corresponding to XPath query 402a at location step 412a and the next SAX event is awaited.

Similarly, for XPath query 402b the potential output nodes are stored in a buffer corresponding to XPath query 402b at location step 412b and the next SAX event is awaited.

SAX event 428 is encountered.

For XPath query 402a the following steps are performed:

In an embodiment of the invention, the location path includes the main location path. The node corresponding to SAX event 428 is identified as potential output node and buffered at location step 412a. Further, as location step 412a includes an unevaluated predicate ["price>60"] the predicate is evaluated using progressive predicate evaluation technique. The predicate evaluation results in True since SAX event 422 includes content satisfying the predicate ["price>60"]. The result of predicate evaluation is stored in the buffer at location step 412a and next SAX event is awaited.

For XPath query 402b the node corresponding to SAX event 428 is identified as potential output node and buffered at location step 412b. Next SAX event is then awaited.

SAX event 430 which is an EndofElement type is encountered.

For XPath query 402a the following steps are performed:

In an embodiment of the invention, the location path includes the main location path. A check is performed to find if any location step includes an unevaluated predicate. Since, no location step includes an unevaluated predicate, the potential output nodes are outputted and the storage including the potential output nodes are cleared. The storage of result of evaluation of predicate "[price>60]" is cleared as it is not required for further processing of XPath query 402a. However, the storage of result of evaluation of predicate "[year=2006]" is maintained for further processing as EndofElement type SAX event for "pub" is not encountered yet.

Similarly, for XPath query 402b the potential output nodes are outputted and the storage including the potential output nodes are cleared. However, the storage of result of evaluation of predicate "[year=2006]" is maintained for further processing as EndofElement type SAX event for "pub" is not encountered yet.

SAX event 432 which is an EndofElement type is encountered.

For both XPath query 402*a* and XPath query 402*b* all the buffers including potential output nodes and predicate results are discarded as end of "pub" is encountered.

Embodiments of the invention provide for simultaneous evaluation of multiple XPath queries thereby reducing delay in output. Further, a SAX event is read only once and multiple XPath queries are processed improving efficiency. The buffering of potential output nodes only up to the point where all the predicates can be evaluated helps in an efficient usage of memory. Further, the evaluation of the predicates and outputting nodes as and when data becomes available improves time-efficiency and reduces delay. Moreover, discarding the buffer of potential output nodes as soon as they are outputted helps in utilizing memory optimally. Also, storing Boolean result "True" reduces memory requirement for storage.

In embodiment of the invention, one or more steps of the method described in FIG. 3, FIG. 4*a* and FIG. 4*b* may be implemented using a computer system.

Figure 5:
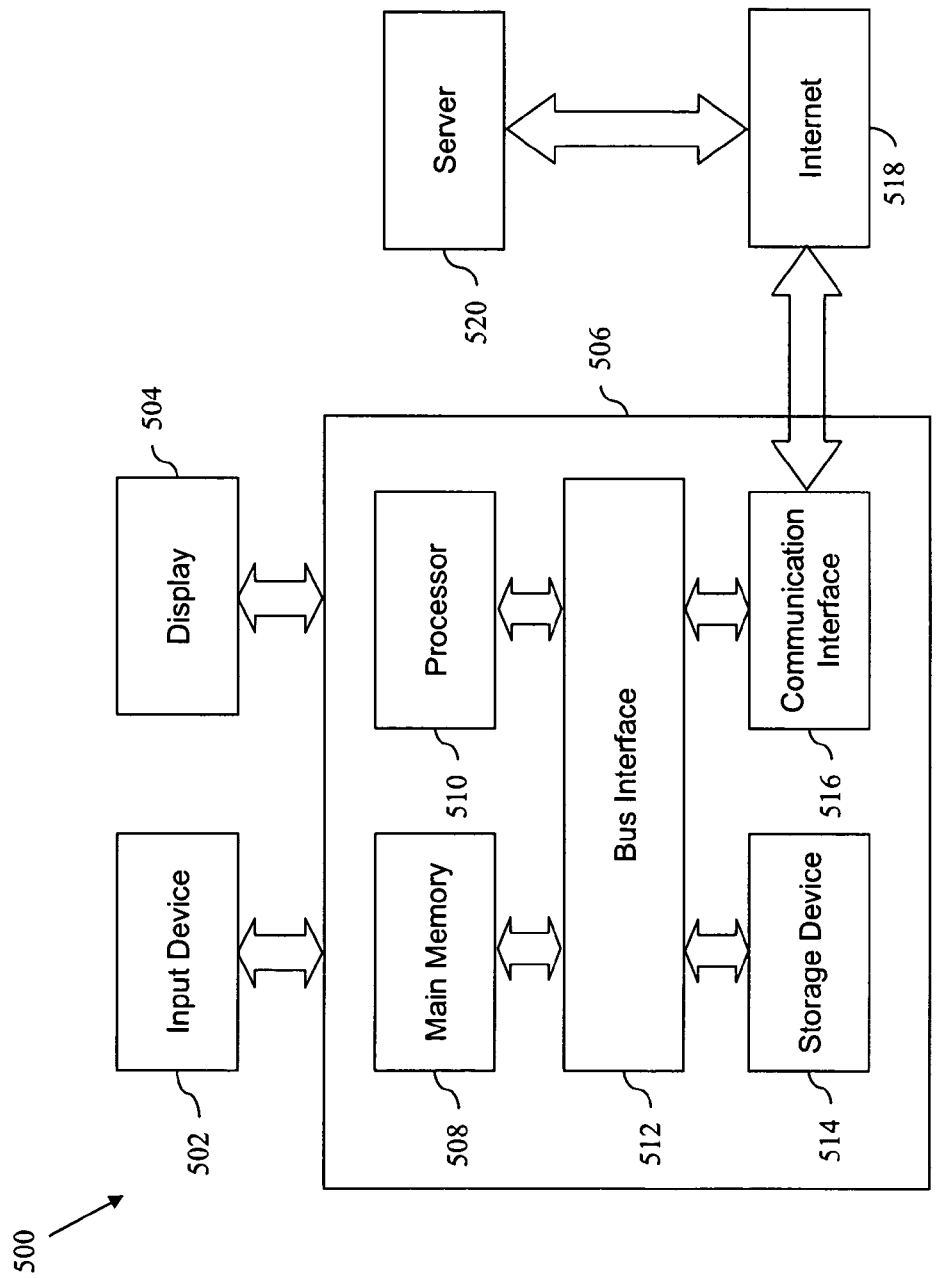
FIG. 5 is a block diagram of an exemplary computer system 500 upon which various embodiments of the invention may be implemented.

FIG. 5 is a block diagram of an exemplary computer system 500 upon which various embodiments of the invention may be implemented. Computer system 500 includes a processing unit 506 including a main memory 508, such as a Random Access Memory (RAM) or other dynamic storage device, coupled to a bus interface 512 for storing information and instructions to be executed by processor 510. A storage device 514, such as a magnetic disk or optical disk, is provided and coupled to bus interface 512 for storing information and instructions. Computer system 500 may be coupled via bus interface 512 to a display 504 for displaying information to a user. An input device 502, including alphanumeric and other keys, is coupled to bus interface 512 for communicating information and command selections to processor 510.

Embodiments of the invention are related to the use of computer system 500 for implementing the techniques described herein. In an embodiment of the invention, those techniques are performed by computer system 500 in response to processor 510 executing one or more sequences of one or more instructions included in main memory 508. Such instructions may be read into main memory 508 from another machine-readable medium product, such as storage device 514. Execution of the sequences of instructions included in main memory 508 causes processor 510 to perform the method embodiment of the invention described herein. In alternative embodiments, hard-wired circuitry may be used in place of or in combination with software instructions to implement the invention. Thus, embodiments of the invention are not limited to any specific combination of hardware circuitry and software.

The term "machine-readable medium product" as used herein refers to any medium that participates in providing data that causes a machine to operation in a specific fashion. Examples of the machine-readable medium product include but are not limited to memory devices, tapes, disks, cassettes, integrated circuits, servers, online software, download links, installation links, and online links.

In an embodiment implemented using computer system 500, various machine-readable medium products are involved, for example, in providing instructions to processor 510 for execution. Computer system 500 also includes a communication interface 516 coupled to bus interface 512. Communication interface 516 provides a two-way data communication coupling to internet 518 that is coupled a server 520. Server 520 might transmit a requested code for an application program through internet 518 and communication interface 516.

The foregoing description sets forth numerous specific details to convey a thorough understanding of embodiments of the invention. However, it will be apparent to one skilled in the art that embodiments of the invention may be practiced without these specific details. Some well-known features are not described in detail in order to avoid obscuring the invention. Other variations and embodiments are possible in light of above teachings, and it is thus intended that the scope of invention not be limited by this Detailed Description, but only by the following Claims.

What is claimed is:

1. A computer-implemented method comprising:
   receiving, by a computer, XPath queries for simultaneous processing, the XPath queries relating to user profiles or preferences and comprising a main location path and one or more nested paths;
   determining hit of a location path in a SAX event responsive to encountering an XML attribute or an XML element used to process the XPath queries, the hit indicating that the location path is in an accepting state reached by Y-filter Nondeterministic Finite Automation (NFA);
   identifying all XPath queries corresponding to the location path, each XPath query having a unique path id used as a key;
   identifying an XML node associated with the SAX event as a potential output node for all XPath queries in which the location path includes a main location path, wherein the potential output node is a node satisfying criteria of a node test of a last location step of the main location path, and evaluating a predicate expression to which the location path belongs for XPath queries in which the location path does not include a main location path;
   buffering the potential output node for all XPath queries comprising unevaluated predicates, wherein for each XPath query the potential output node is buffered at a location step comprising an unevaluated predicate;
   evaluating all XPath queries by progressively evaluating the unevaluated predicates of all XPath queries based on availability of data; and
   moving buffers comprising the potential output node and intermediate or complete results of predicate evaluation from the location step to another location step, where in the another location step comprises one or more unevaluated predicates.

2. The method of claim 1, wherein the evaluating comprises:
   storing intermediate or complete results of evaluation of the unevaluated predicates if the unevaluated predicates give a Boolean result.

3. The method of claim 1 further comprising outputting the potential output node for all XPath queries comprising no unevaluated predicate.

4. The method of claim 1 further comprising:
   moving buffers comprising the potential output node and intermediate or complete results of predicate evaluation from the location step to another location step, where in the another location step comprises one or more unevaluated predicates.

5. A computer system, at least partially implemented in hardware, for evaluating an XPath query, the computer system comprising:
   a receiving module, in the computer system, to receive XPath queries for simultaneous processing, the XPath queries relating to user profiles or preferences and comprising a main location path and one or more nested paths;

a location module, in the computer system, for determining hit of a location path in a SAX even responsive to encountering an XML attribute or an XMLO element used to process the XPath queries, the hit indicating that the location path is in an accepting state reached by Y-filter Nondeterministic Finite Automation (NFA);

an XPath query identification module for identifying all XPath queries corresponding to the location path, each XPath query having a unique path id used as a key;

a node identification module for identifying an XML node associated with the SAX event as a potential output node for all XPath queries in which the location path includes a main location path, wherein the potential output node is a node satisfying criteria of a node test of a last location step of the main location path, and evaluating a predicate expression to which the location path belongs for XPath queries in which the location path does not include a main location path;

a buffer module for buffering potential output nodes for all XPath queries comprising unevaluated predicates, wherein for each XPath query the potential output node is buffered at a location step comprising an unevaluated predicate a predicate evaluation engine for evaluating all XPath queries by progressively evaluating the unevaluated predicates of all XPath queries based on availability of data;

wherein the buffer module moves buffers comprising the potential output node and intermediate or complete results of predicate evaluation from the location step to another location step, where in the another location step comprises one or more unevaluated predicates.

6. A non-transitory machine-readable medium product storing instructions operable to cause a programmable processor to perform a method, comprising:

receiving, by a computer, XPath queries for simultaneous processing, the XPath queries relating to user profiles or preferences and comprising a main location path and one or more nested paths;

determining hit of a location path in a SAX event responsive to encountering an XML attribute or an XML element used to process the XPath queries, the hit indicating that the location path is in an accepting state reached by Y-filter Nondeterministic Finite Automation (NFA);

identifying all XPath queries corresponding to the location path, each XPath query having a unique path id used as a key;

identifying an XML node associated with the SAX event as a potential output node for all XPath queries in which the location path includes a main location path, wherein the potential output node is a node satisfying criteria of a node test of a last location step of the main location path, and evaluating a predicate expression to which the location path belongs for XPath queries in which the location path does not include a main location path;

buffering the potential output node for all XPath queries comprising unevaluated predicates, wherein for each XPath query the potential output node is buffered at a location step comprising an unevaluated predicate;

evaluating all XPath queries by progressively evaluating the unevaluated predicates of all XPath queries based on availability of data; and moving buffers comprising the potential output node and intermediate or complete results of predicate evaluation from the location step to another location step, where in the another location step comprises one or more unevaluated predicates.

7. The machine-readable medium product of claim 6 further comprising instructions operable to cause a programmable processor to perform storing intermediate or complete results of evaluation of the unevaluated predicates if the unevaluated predicates give a Boolean result.

8. The machine-readable medium product of claim 6 further comprising instructions operable to cause a programmable processor to perform outputting the potential output node for all XPath queries comprising no unevaluated predicate.

9. The machine-readable medium product of claim 6 further comprising:

moving buffers comprising the potential output node and intermediate or complete results of evaluation from the location step to another location step, where in the another location step comprises one or more unevaluated predicates.

10. The method of claim 1, wherein evaluating a predicate expression to which the location path belongs for XPath queries in which the location path does not include a main location path comprises a bottom-up evaluation technique.

11. The method of claim 1, further comprising:

allotting storing for predicate results during parsing of XPath queries.

12. The method of claim 1, further comprising:

maintaining a hash map including path ids of the XPath queries.

13. The method of claim 1, further comprising:

responsive to the SAX event comprising an EndofElement type event, performing a check to determine if the location path includes any unevaluated predicate.

14. The method of claim 1, wherein the XPath queries comprise one main location path and one or more nested location paths.

15. The method of claim 1, further comprising:

during processing, using an inline approach for evaluation of XPath queries.

16. The method of claim 1, further comprising:

parsing an XML document received in an online stream to generate the SAX event.

17. The method of claim 1, further comprising:

reading the SAX event only once to process multiple XPath queries.

* * * * *